3,221,046
PROCESS FOR CONCENTRATING AQUEOUS SOLUTIONS OF CAMPHORSULFONIC ACID
David A. Johnson, Fayetteville, and Glenn A. Hardcastle, Jr., Syracuse, N.Y., assignors to Bristol-Myers Company, New York, N.Y., a corporation of Delaware
No Drawing. Filed Apr. 2, 1963, Ser. No. 269,868
3 Claims. (Cl. 260—503)

This application relates to a novel and highly useful process for the recovery of d-10-camphorsulfonic acid and, more particularly, to a highly efficient process for the purification and concentration of aqueous solutions of d-10-camphorsulfonic acid.

Resolutions of racemic bases are carried out by means of the use of d-10-camphorsulfonic acid but it is a costly reagent and it must be recovered efficiently for re-use to avoid prohibitive expense. The efficient recovery of this acid is rendered difficulty by its extreme solubility in water. Its recovery, as by absorption on and elution from, an ion exchange resin, provides recovered acid in the form of dilute aqueous solutions which must be concentrated, as by vacuum distillation, at considerable cost. In addition it is found that ammonium ion interferes with resolutions and must therefore be removed from recovered acid.

An example of such a resolution involves the therapeutic agent α-aminobenzylpenicillin which occurs as two diastereoisomers. The commercial form, named D-(−), is the isomer prepared by condensation of natural 6-aminopenicillanic acid and D-(−)-2-phenylglycine having a specific rotation in 1 N HCl of about −157°. For the synthesis of this product it is therefore necessary to resolve the synthetic, and therefore racemic, 2-phenylglycine which is the available starting material.

It is the object of the present invention to provide a highly efficient and inexpensive method for purifying and concentrating impure, relatively dilute aqueous solutions of d-10-camphorsulfonic acid, e.g. the liquors remaining after resolution of 2-phenylglycine with said acid.

The object of the present invention has been attained by the provision, according to the present invention, of a process of preparing a purified, concentrated aqueous solution of d-10-camphorsulfonic acid from an impure, relatively dilute aqueous solution thereof which comprises the consecutive steps of (a) mixing at about pH 3–6 and impure dilute aqueous solution of d-10-camphorsulfonic acid with a water-immiscible, neutral organic solvent and about one to six moles (per mole of the d-10-camphorsulfonic acid) of a member selected from the group consisting of secondary amines of the formula

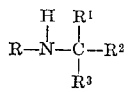

wherein R is an aliphatic group having from 10 to 14 carbon atoms and $R^1$, $R^2$ and $R^3$ are each alkyl groups having a total of 11 to 14 carbon atoms, said secondary amines being liquid at room temperature and soluble in said organic solvent, and mixtures thereof; (b) separating from said mixture the organic solvent phase; (c) mixing said organic solvent phase with a lesser volume of water at a highly alkaline pH to transfer the d-10-camphorsulfonic acid into a second aqueous phase; and (d) separating and then acidifying said second aqueous phase to provide a purified, concentrated aqueous solution of d-10-camphorsulfonic acid.

A preferred and highly specific embodiment of the present invention comprises the process of preparing a purified, concentrated aqueous solution of d-10-camphorsulfonic acid from an impure, relatively dilute aqueous solution thereof which comprises the consecutive steps of (a) mixing at about pH 4–5 an impure, dilute aqueous solution of d-10-camphorsulfonic acid with about two volumes of toluene as a water-immiscible, neutral organic solvent and about two or six moles (per mole of the d-10-campshorsulfonic acid) of a member selected from the group consisting of secondary amines of the formula

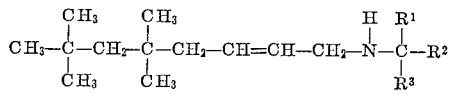

wherein each of $R^1$, $R^2$ and $R^3$ is an aliphatic hydrocarbon radical and $R^1$, $R^2$ and $R^3$ contain in the aggregate from 11 to 14 carbon atoms, said secondary amines being liquid at room temperature and soluble in said organic solvent, and mixtures thereof; (b) separating from said mixture the organic solvent phase; (c) mixing said organic solvent phase with a lesser volume of water at a pH above 9.0 to transfer the d-10-camphorsulfonic acid into a second aqueous phase; and (d) separating and then acidifying said second aqueous phase to provide a purified, concentrated aqueous solution of d-10-camphorsulfonic acid.

The starting materials for the operation of the process of the present invention can be, for example, separate aqueous solutions of the d-10-camphorsulfonic acid salts of L-(+)-2-phenylglycine and D-(−)-2-phenylglycine. The addition to a solution of either salt of concentrated ammonium hydroxide (as to pH 7–8) or of a strong base such as 50% NaOH (as to pH 4.5) causes the precipitation in its amphoteric form of the appropriate isomer of 2-phenylglycine and leaves after filtration an aqueous solution of the corresponding ammonium or metal salt of d-10-camphorsulfonic acid.

These solutions, which may be combined, are then adjusted to about pH 3–6, and preferably about pH 4.0–5.0, and mixed thoroughly with a solution in about one to ten volumes, and preferably about two volumes, of a water-immiscible, neutral organic solvent such as butanol, methyl isobutyl ketone or, preferably, toluene (or a similar solvent having a negligible solubility in water) of at least one mole, and preferably about 2–6 moles (per mole of salt), of the amines and mixtures thereof which are liquid at room temperatures and soluble in the organic solvent and which have the formula

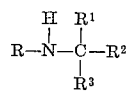

wherein R is an aliphatic group having from 10 to 14 carbon atoms and $R^1$, $R^2$ and $R^3$ are each alkyl groups having in the aggregate a total of from 11 to 14 carbon atoms.

A preferred group of amines of the class described above are those amines and mixtures thereof which have the formula

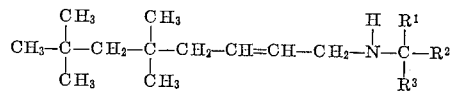

wherein each of $R^1$, $R^2$ and $R^3$ is an aliphatic hydrocarbon radical and wherein $R^1$, $R^2$ and $R^3$ contain in the aggregate from 11 to 14 carbon atoms; this particular mixture of secondary amines, which is sometimes referred to as "Liquid Amine Mixture No. I," is a clear amber liquid having the following physical characteristics: viscosity at 25° C. of 70 cps.; specific gravity at 20° C. of 0.845; refractive index at 25° C. of 1.467; distillation range at 10 mm.: up to 160° C.—4%, 160 to 210° C.—5%, 210 to 220° C.—74%, above 220° C.—

17%. Another preferred group of amines of the class described above is a mixture of secondary amines wherein each secondary amine has the formula

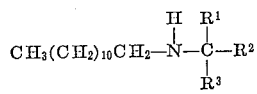

wherein each of $R^1$, $R^2$ and $R^3$ is a monovalent aliphatic hydrocarbon radical and wherein $R^1$, $R^2$ and $R^3$ contain in the aggregate from 11 to 14 carbon atoms. This particular mixture of secondary amines, which is sometimes referred to as "Liquid Amine Mixture No. II," is a clear amber liquid having the following physical characteristics: viscosity at 25° C. of 70 cps., specific gravity at 20° C. of 0.826; refractive index at 25° C. of 1.4554; distillation range at 10 mm., up to 170° C.—0.5%, 170 to 220° C.—3%, 220 to 230° C.—90% and above 230° C.—6.5%. "Liquid Amine Mixture No. I" and "Liquid Amine Mixture No. II" are available from Rohm and Haas Company, Washington Square, Philadelphia 5, Pa., as "Amberlite LA–1" and "Amberlite LA–2," respectively.

Upon separation the solvent-amine solution contains the d-10-camphorsulfonic acid, which is extracted therefrom into water (e.g. about one-sixth volume) by adjusting the pH to a highly alkaline point (i.e. to at least pH 9.0, as to pH 9.1 with 50% NaOH). Only enough base need be used to convert the amine to the base form; this is indicated by a sharp pH change at about pH 8–9. The water layer containing the d-10-camphorsulfonic acid is separated and the solvent-amine phase is re-extracted if desired and the aqueous extracts combined. Addition of concentrated acid, e.g. conc. HCl in the minimum amount necessary to convert all of the d-10-camphorsulfonic acid salt to the acid form, then gives an aqueous solution containing 95% of the original d-10-camphorsulfonic acid which is completely suitable for the resolution of fresh 2-phenylglycine. This solution is so used by addition thereto of about one mole of 2-phenylglycine per 1.3 moles of the d-10-camphorsulfonic acid with stirring at an elevated temperature, e.g. 60–70° C., to form a slurry which dissolves on further heating, e.g. to about 85–90° C., is decolorized by charcoal if desired, filtered hot and then cooled slowly to precipitate selectively the desired d-10-camphorsulfonic acid salt of D-(—)-2-phenylglycine in high yield. Filtration then gives as the filtrate an aqueous solution of excess d-10-camphorsulfonic acid and the d-10-camphorsulfonic acid salt of L-(+)-2-phenylglycine. The solid d-10-camphorsulfonic acid salt of D-(—)-2-phenylglycine dissolves in about three times its weight of water at about 85–90° C., thus completing the cycle as described above.

In addition, the recovered but undesired L-(+)-2-phenylglycine is easily racemized by refluxing for an extended period of time, e.g. eight hours, in water containing 5–20% by weight of caustic, e.g. sodium hydroxide. Upon cooling and adjusting to about pH 7, there is precipitated racemic 2-phenylglycine of good quality and high yield which is suitable for recycling. The process of the present invention is equally applicable to the recovery of d-10-camphorsulfonic acid from mother liquors obtained in the resolution of other amines and particularly of α-amino-acids including substituted 2-phenylglycines such as those disclosed in U.S. Patent 2,985,648.

The following example will serve to illustrate the present invention without limiting it thereto.

EXAMPLE (A) *The isolation of D-(—)-2-phenylglycine*

Step 1.—To 100 g. (0.43 mole) of d-10-camphorsulfonic acid (CSA) in 300 ml. water at 60–70° C. there is added 50 g. (0.33 mole) of racemic 2-phenylglycine (PG) with stirring to form a slurry of the CSA salts of L-(+)-2-phenylglycine and D-(—)-2-phenylglycine, hereinafter called CSA·L(+)PG and CSA·D(—)PG.

Step 2.—The slurry is heated until it dissolves at approximately 85–90° C. and there is then added 3.74 g. of activated charcoal (Darco KB).

Step 3.—The solution containing charcoal is stirred for 10–15 minutes at approximately 90° C. and filtered hot to remove the charcoal, which is washed with 50 ml. hot water.

Step 4.—The filtrate is stirred and cooled very slowly to about 15° C. over four hours. It is then cooled to 5° C. and held there for three or four hours, precipictating CSA·D(—)PG.

Step 5.—The solid CSA·D(—)PG is collected by filtration and washed with 50 ml. ice-cold water. The filtrate (mother liquor) containing CSA·L(+)PG and excess CSA is saved for recovery of the CSA and racemization of the L(+)PG.

Step 6.—The yield of wet, solid CSA·D(—)PG is about 62 g. (90% solids).

Step 7.—The CSA·D(—)PG cake from Step 5 is mixed while still damp with three times its weight of water, stirred and heated at about 85–90° C. until it dissolves.

Step 8.—The hot solution is filtered through diatomaceous earth (Dicalite) which is then washed with 25 ml. hot water.

Step 9.—To the hot filtrate while stirring there is added sufficient concentrated ammonium hydroxide (about 16 ml.) to adjust the pH to the range of 7–8. The D(—)PG precipitates in crystalline form.

Step 10.—The crystalline slurry is stirred and cooled to 0–5° C. over a two-hour period while maintaining the pH at 7–8, filtered and the D(—)PG cake is washed with 25 ml. ice-cold water.

Step 11.—The collected D(—)PG is dried in an oven at 50–60° C. and found to weigh about 19 g. (76% of theory) and to have a specific rotation of about —155°.

Step 12.—The filtrate (mother liquor) from Step 10 is reserved for recovery of CSA.

(B) *The isolation and racemization of L-(+)-2-phenylglycine*

Step 13.—The mother liquor from Step 5 containing CSA·L(+)PG and excess CSA is adjusted to pH 4.5 with 50% NaOH solution with stirring and the resulting slurry of crystalline L(+)PG is cooled to 0–5° C., collected by filtration and washed with 75 ml. cold water.

The filtrate (mother liquor) is saved for recovery of the CSA therein.

The solid L(+)PG is slurried in about 475 ml. water or, preferably, in the extracted water from Step 14 below, and, after adding a number of grams of solid caustic equal to 10% of the volume of water in ml., the solution is refluxed for eight hours. The mixture is then cooled to 0–10° C., adjusted to pH 7 with HCl and stirred two hours. The precipitated racemic 2-phenylglycine is collected by filtration, washed with cold water, dried and is then ready for re-use.

(C) *The recovery of CSA*

Step 14.—The CSA-containing mother liquor from Step 13 is mixed with a solution of 400 ml. (0.9 mole) of Liquid Amine Mixture No. I in 800 ml. toluene and the pH is adjusted to 4.5–5.0 with conc. HCl or 50% NaOH. After thorough mixing the two layers are separated. The toluene phase contains the CSA. The aqueous phase is set aside for use in Step 13.

Step 15.—The CSA-containing toluene phase from Step 14 is mixed with the CSA-rich mother liquor of Step 12 and the pH is adjusted to 4.5–5.0. After thorough mixing and separating, there is obtained a toluene phase containing virtually all of the CSA used originally in Step 1.

Step 16.—To the CSA-containing toluene phase of Step 15 there is added 200 ml. water and the pH of the mixture is adjusted to 9.1 with 50% NaOH (about 38 ml.) while mixing thoroughly. Upon separation there is obtained an aqueous phase containing the CSA and a toluene phase.

*Step 17.*—The toluene phase from Step 16 is re-extracted with 50 ml. water and the aqueous extract is combined with that from Step 16. To the combined CSA-containing aqueous extracts there is then added 34.2 ml. (0.41 mole) concentrated HCl and 5.0 g. fresh CSA. This solution is then filtered through diatomaceous earth (Dicalite) to clarify it. The filter cake is washed with enough water to bring the volume of filtrate up to 400 ml.

The filtrate thus obtained contains 100 g. CSA and is fully suitable for use in another cycle, i.e. by adding thereto at 60–70° C. 50 g. racemic 2-phenylglycine as in Step 1 and proceeding as before.

While various embodiments have been described in some detail it will be understood that modifications can be made in the procedures described without departing from the scope of the invention. Certain agents, compounds, or mixtures (e.g. acids, bases, solvents and the like) and other details described or equivalent to those described in relation to one procedure may be employed in connection with other procedures. For example, in the event that the impure, dilute aqueous solution of d-10-camphorsulfonic acid is quite dilute, i.e. about 1%, it is no longer necessary or even advisable to use an equal volume of the water-immiscible neutral organic solvent and in such case the volume of said solvent need be only one-tenth the volume of the aqueous solution or even less as determined by simple test.

We claim:

1. The process of preparing a purified, concentrated aqueous solution of d-10-camphorsulfonic acid from an impure, relatively dilute aqueous solution thereof which comprises the consecutive steps of
   (a) mixing at about pH 3–6 an impure, dilute aqueous solution of d-10-camphorsulfonic acid with a water-immiscible, neutral organic solvent and about one to six moles (per mole of the d-10-camphorsulfonic acid) of at least one secondary amine of the formula

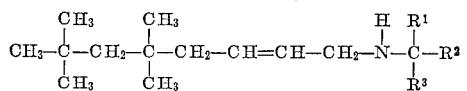

wherein each of $R^1$, $R^2$ and $R^3$ is an aliphatic hydrocarbon radical and $R^1$, $R^2$ and $R^3$ contain in the aggregate from 11 to 14 carbon atoms, said secondary amines being liquid at room temperature and soluble in said organic solvent;
   (b) separating from said mixture the organic solvent phase;
   (c) mixing said organic solvent phase with a lesser volume of water at a pH above 9.0 to transfer the d-10-camphorsulfonic acid into a second aqueous phase; and
   (d) separating and then acidifying said second aqueous phase to provide a purified, concentrated aqueous solution of d-10-camphorsulfonic acid.

2. The process of preparing a purified, concentrated aqueous solution of d-10-camphorsulfonic acid from an impure, relatively dilute aqueous solution thereof which comprises the consecutive steps of
   (a) mixing at about pH 4–5 an impure, dilute aqueous solution of d-10-camphorsulfonic acid with about two volumes of a water-immiscible, neutral organic solvent and about two to six moles (per mole of the d-10-camphorsulfonic acid) of at least one secondary amine of the formula

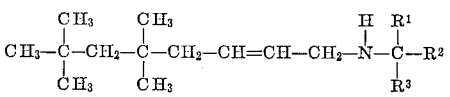

wherein each of $R^1$, $R^2$ and $R^3$ is an aliphatic hydrocarbon radical and $R^1$, $R^2$ and $R^3$ contain in the aggregate from 11 to 14 carbon atoms, said secondary amines being liquid at room temperature and soluble in said organic solvent;
   (b) separating from said mixture the organic solvent phase;
   (c) mixing said organic solvent phase with a lesser volume of water at a pH above 9.0 to transfer the d-10-camphorsulfonic acid into a second aqueous phase; and
   (d) separating and then acidifying said second aqueous phase to provide a purified, concentrated aqueous solution of d-10-camphorsulfonic acid.

3. The process of preparing a purified, concentrated aqueous solution of d-10-camphorsulfonic acid from an impure, relatively dilute aqueous solution thereof which comprises the consecutive steps of
   (a) mixing at about pH 3–6 an impure, dilute aqueous solution of d-10-camphorsulfonic acid with toluene as a water-immiscible, neutral organic solvent and about one to six moles (per mole of the d-10-camphorsulfonic acid) of at least one secondary amine of the formula

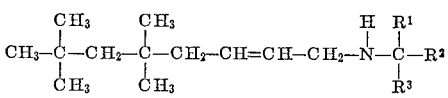

wherein each of $R^1$, $R^2$ and $R^3$ is an aliphatic hydrocarbon radical and $R^1$, $R^2$ and $R^3$ contain in the aggregate from 11 to 14 carbon atoms, said secondary amines being liquid at room temperature and soluble in said organic solvent;
   (b) separating from said mixture the organic solvent phase;
   (c) mixing said organic solvent phase with a lesser volume of water at a pH above 9.0 to transfer the d-10-camphorsulfonic acid into a second aqueous phase; and
   (d) separating and then acidifying said second aqueous phase to provide a purified, concentrated aqueous solution of d-10-camphorsulfonic acid.

References Cited by the Examiner

FOREIGN PATENTS 1,035,513  8/1953  France.
115,863    2/1937  Hungary.

OTHER REFERENCES

Houben-Weyl: Methoden der Organischen Chemie, vol. 4, part II, 1955, pp. 513–523.

References Cited by the Applicant

UNITED STATES PATENTS 2,985,648   5/1961   Doyle et al.
3,008,956   11/1961  Nettleton et al.

LORRAINE A. WEINBERGER, *Primary Examiner.*
LEON ZITVER, *Examiner.*